United States Patent Office 3,522,251
Patented July 28, 1970

3,522,251
BASIC ESTERS OF 5-AMINO-3-(5'-NITROFUR-2'-YL)ISOXAZOLE-4-CARBOXYLIC ACID
Raymond Urgel Lemieux, Edmonton, Alberta, and Ronald George Micetich, Sherwood Park, Alberta, Canada, assignors to R & L Molecular Research Ltd., Edmonton, Alberta, Canada, a body corporate
No Drawing. Filed Apr. 3, 1968, Ser. No. 718,328
Int. Cl. C07d 85/22
U.S. Cl. 260—247.2                     5 Claims

ABSTRACT OF THE DISCLOSURE

Compounds of the formula:

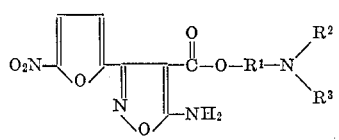

wherein $R^1$ is lower-alkylene or together with $R^2$ and N, a ring of up to 10 carbons; $R^2$ and $R^3$ are lower-alkyl or together with N, a ring of up to 10 carbons; or a non-toxic pharmacetuically acceptable acid addition salt thereof, are prepared by a process which comprises reacting a mixture of a compound represented by the formula:

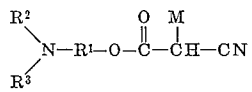

wherein $R^1$, $R^2$ and $R^3$ are as defined above and M is an alkali metal, with a N-nitrofuryl-2-haloaldoxime; and recovering the resulting compound from the reaction mixture. The compounds are antimicrobial agents and trichomonacids.

BACKGROUND OF THE INVENTION

Field of the invention

This invention relates to novel synthetic compounds of value as antibacterial agents, as nutritional supplements in animal feeds, as agents for the treatment of mastitis in cattle and as therapeutic agents in poultry and animals, including man, in the treatment of infectious diseases caused by gram-positive and gram-negative bacteria and by trichomonads.

There exists a need to provide alternative and improved agents for the treatment of infections caused both by gram-positive bacteria (including those resistant to benzylpenicillin) and by gram-negative bacteria and for the decontamination of objects bearing such organisms, e.g., hospital equipment, walls of operating rooms, and the like. Of particular need are antibacterial agents which exhibit good oral absorption in animals.

Trichomoniasis is a disease caused by trichomonads in both humans and animals. The disease in the human female is characterized by a persistent vaginal discharge. The trichomonad also sometimes invades the male urethra and bladder. In animals, trichomoniasis is a venereal disease accompanied by abortion, sterility and pyometra. Because of the seriousness of the disease, various attempts have been made to develop effective trichomonocidal agents. These attempts have been successful in part, but an agent which is effective against one species of trichomonad may not be as effective against another species, and it is not uncommon to find that a trichomonocide which is generally non-toxic to one species of host may be toxic to specific members of that species. Thus, there is a continuing need for the development of new trichromonocidal compositions for the medical armamentarium so that treatment of a particular individual can be adjusted to that individual by choice of the trichomonocidal compound which best suits the immediate situation.

It is thus an object of the present invention to provide a new class of chemical compounds. It is another object of this invention to provide new antibacterial and trichomonicidal compositions of matter. It is a further object of the present invention to provide a means for treating antibacterial infections and trichomoniasis which involves administering the new compounds of this invention in suitable dosage unit form.

Description of the prior art

Certain substituted 3-(5'-nitrofur-2'-yl)isoxazoles have been described by Doyle et al. in U.S. Pat. 2,996,501 and in J. Chem. Soc. (London) 5845–5854 (1963) as intermediates for the synthesis of penicillins and by J. R. Geigy A. G. in Netherlands Pat. 6,611,584 as antimicrobial agents. As described in New Drugs, 1967 Edition, American Medical Association, Chicago, Ill., agents currently in use for the therapy of antimicrobial and trichomonacidal infections include nitrofurazone, nitrofurantoin and furazolidone (for which see pages 29–32), metronidazole (for which see pages 85–87) and nalidixic acid (for which see pages 51–53).

Additional nitrofuran derivatives have been described by Jun-ichi Matsumoto and Shinsaku Minami: Studies on Nitrofuran Derivatives. VIII. Synthesis of 3-(5-nitro-2-furyl)isoxazoles, Chem. Pharm. Bull. (Japan), 15(11), 1806–1808 (1967).

SUMMARY OF THE INVENTION

This invention relates to and has for its object the provision of substituted heterocyclic compounds, and, more particularly, nitrofuryl derivatives of isoxazoles. It further relates to new processes for the preparation of these compounds and, still further, to the utilization of these compounds as general purpose anti-microbials and, in appropriate pharmaceutical formulations, as anti-microbial agents and trichomonacides.

In accordance with one aspect of the present invention, there are provided aminoalkyl 5-amino-3-(5'-nitrofur-2'-yl)isoxazole - 4 - carboxylates characterized by the Formula I:

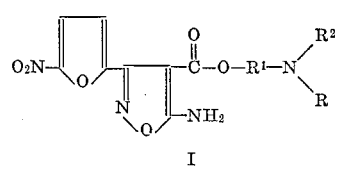

I wherein $R^1$ is lower-alkylene (including lower-alkylidene) or together with $R^2$ and N, a ring containing one nitrogen and up to 10 carbons; $R^2$ and $R^3$ are lower-alkyl or together with N, a ring of up to 10 carbons which may contain an additional hetero atom, e.g., O, N, or S. This invention includes the non-toxic acid addition salts of the compounds of Formula I. The term "lower-alkyl" as used herein means straight, branched and cyclic non-hindered saturated hydrocarbon residues of 1–7 carbon atoms such as methyl, ethyl, propyl, isopropyl, n-butyl, amyl, hexyl and heptyl groups. Not included are hindered alkyls such as tertiary butyl groups. Alkyl groups having about 1–4 carbon atoms are preferred. The term "lower-alkylene" refers to the corresponding divalent hydrocarbon radicals, and the term "lower-alkylidene" refers to radicals having 3–4 carbon atoms.

The preferred compounds of the present invention are those of Formula I wherein $R^1$ is ethylene and $R^2$ and $R^3$ are methyl, ethyl or, taken together with the nitrogen atom, morpholino or piperidino or a non-toxic, pharmaceutically acceptable salt of any of these compounds.

In another aspect of this invention, there is provided a method for the preparation of the compounds of Formula I in the manner represented by the following equation:

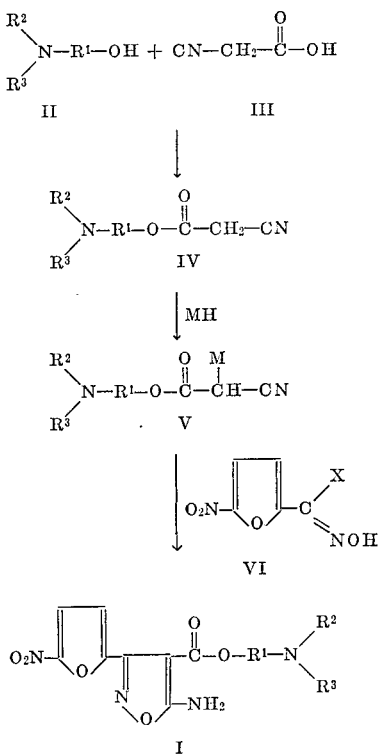

In the foregoing equation, $R^1$, $R^2$ and $R^3$ are as defined above, M represents an alkali metal such as sodium, lithium or potassium and X is either chloro or bromo.

In the first step of preparing the compounds represented by Formula I, cyanoacetic acid represented by Formula III is reacted with an equimolar amount of a tertiary amino alcohol represented by Formula II. The reaction is carried out in an inert organic solvent at a temperature of from about −20° C. to about 50° C., preferably less than about 20° C. employing a suitable condensing agent such as a dialkylcarbodiimide which, as is well-known in the art, first reacts with the acid (III) to form an acylating agent which subsequently acylates the alcohol (II). The water of condensation is incorporated into the condensing agent.

Suitable reaction media are inert dry organic solvents including acetone, methyl ethyl ketone, methyl isobutyl ketone, tetrahydrofuran, ethyl acetate, dioxane, dimethylformamide, and the dialkylethers of ethylene or diethylene glycol, e.g., dimethoxyethane.

The compound represented by Formula IV is reacted with an alkali metal hydride such as sodium hydride, lithium hydride, or potassium hydride to yield the compound of Formula V. The reaction is carried out in an inert reaction medium and preferably under an inert atmosphere, usually in a closed vessel fitted with means to introduce a dry, inert gas. The reaction temperature is maintained below about 20° C. and preferably below about 10° C. Approximately equimolar amounts of the preferred reagent, sodium hydride, and the compound of Formula IV are employed.

The compound represented by Formula I is prepared by reacting the alkali metal salt represented by Formula V with a 5-nitrofuryl-2-haloaldoxime represented by Formula VI. The reaction is effected in an inert solvent at relatively low temperatures of below about 30° C. and preferably between about 0° C. and about −15° C. The solvent is removed at reduced pressure and at a temperature preferably below about 40° C. The compound represented by Formula I is recovered and can be purified if desired by conventional washing, chromatographic and/or recrystallization techniques. The compounds of Formula I, thus obtained, are converted to their acid addition salts by conventional neutralization procedures. Suitable acids are represented by inorganic acids such as HCl, $H_2SO_4$, $H_3PO_4$, HBr, etc., and organic acids such as acetic, propionic, citric, ascorbic, etc. For pharmaceutical usage, pharmaceutically acceptable acids should be used.

The 5-nitrofuryl-2-haloaldoxime represented by Formula VI can be prepared by reacting 5-nitro-furfurylidene diacetate with hydroxylamine hydrochloride and halogenated with either chlorine or a nitrosyl halide in ether [following the general procedure of Reinholdt et al., Ann. 451, 161 (1926)].

The compounds of this invention have useful antimicrobial properties. In particular, they show in vitro and in vivo activity against both gram-negative bacteria and trichomonas species and are accordingly valuable as general purpose disinfectants and for external or internal use in human or veterinary medicine. Thus, they can be formulated in dilute aqueous or alcoholic solutions or mixed with conventional solid or liquid surfactants and used in home or hospital to both clean and disinfect glassware, dishes and eating utensils. In living organisms, they are active against general staphylococcal infections and infections due to Trichomonas vaginalis and Trichomonas foetus. By virtue of their broad spectrum activity and especially their activity against T. foetus and T. vaginalis, they are particularly valuable in the treatment of infections of the urinary and intestinal tract. The present invention accordingly also comprises compositions containing an effective proportion of an anti-microbial agent of Formula I and a pharmaceutically acceptable carrier therefor, especially when such compositions are in dosage unit form. Pharmaceutical compositions of the present invention contain one or more compounds of Formula I as anti-microbial agents along with a conventional solid or liquid pharmaceutical carrier. The choice of carrier is within the skill of the art and depends upon the route by which the compositions are to be administered. For topical use, the composition may be in the form of an ointment, powder or tincture, using substances which are appropriate for the respective forms. Examples of ointment bases are animal fat and soft hydrocarbon greases, as well as emulsions of polyalkylene glycols. Alcoholic solutions based upon a major portion of ethanol, may be prepared for either topical or oral use. Generally, the concentration of the compound of Formula I will be in the range of about 0.1 to 5 weight percent. Similarly, the anti-microbial agents of the present invention may be incorporated into powdered mixtures in which the carrier is a compatible, active or inert, substance such as sulfur, corn starch, rice starch, talcum, or the like.

For internal use, the active compounds of Formula I may be administered in the form of tablets, dragees, capsules, suppositories, injectable liquids, emulsions, suspensions, syrups, and the like. Such formulations contain in addition to the active component of the present invention, other active components if desired, and conventional liquid or solid pharmaceutical excipients, as well as dyes, preservatives, binders, coating materials, thickeners, lubricants, taste modifiers, and other materials which are conventionally used in the preparation of the selected dosage form.

The pharmaceutical compositions of this invention should be formulated so that they contain at least 0.1% the active anti-microbial agent. The actual percentage of the active component in the composition may be varied and should be conveniently between about 2% and 60%, or more, of the weight of each dosage unit. The amount of active ingredient in a therapeutically useful composition or preparation should be such that a suitable dosage unit will be obtained.

In general, the compositions of the present invention should contain an amount of active ingredient such that the dosage schedule will result in a daily administration of between 1.0 and 500 mgm./kg. of body weight of the animal being treated. In the in vivo tests reported below, groups of mice were challenged with overwhelmingly lethal amounts of *K. pneumoniae* given intraperitoneally as the infecting organism. Each animal was given a measured dose, e.g., 50 mgm./kg., of the active agent intramuscularly or orally at both zero and four hours after challenge and deaths were observed until the end of 72 hours after challenge. The minimum amount of antimicrobial agent which cures 50% of the mice is called the "curative" dose of $CD_{50}$; when that dose was determined to be, for example, 50 mgm./kg. given at each of zero and four hours after challenge, the $CD_{50}$ is reported below as 50×2. Standard techniques are available and used to calculate the $CD_{50}$ when it falls between two of the doses actually used which are 6.3, 12.5, 25, 50, 100 and 200 mgm./kg.

In the treatment of infections in man, the compounds of this invention are administered orally or parenterally in accordance with conventional procedures for antibiotic administration, in an amount of from about 2 to 60 mg./kg./day and preferably about 20 mg./kg./day in divided dosage, e.g., three or four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The follownig examples are presented to further illustrate the present invention.

DESCRIPTION OF THE PREFERRED EMBODIMENTS

Example 1.—N,N-diethylaminoethyl 5-amino-3-(5'-nitrofur-2'-yl)isoxazole-4-carboxylate Diethylaminoethanol (35.1 g., 0.3 mole) and cyanoacetic acid (25.5 g., 0.3 mole) were dissolved in dry ethyl acetate (600 ml.) and dicyclohexylcarbodiimide (61.8 g., 0.3 mole) added. There was an immediate reaction and dicyclohexylurea began to precipitate. The reaction mixture was cooled in an ice bath overnight and the urea derivative filtered off. The filtrate was concentrated under reduced pressure and the residue taken up in dry ether (150 ml.). The suspension was filtered and the solvent removed, leaving a yellow oil (60 g.) which is N,N-diethylaminoethyl cyanoacetate.

Sodium hydride (58% in oil, 4.1 g., 0.1 mole) was washed twice with hexane to remove the oil and then suspended in dry tetrahydrofuran (60 ml.). A stream of dry nitrogen was passed through the stirred suspension and a solution of diethylaminoethyl cyanoacetate (18.4 g., 0.1 mole) in dry tetrahydrofuran (25 ml.) added. There was an immediate exothermic reaction and the temperature rose to 35°. The mixture, containing the sodio derivative, was stirred at room temperature for 10 minutes and then cooled to −20°.

A solution of 5-nitrofuryl-2-chloraldoxime (19 g., 0.1 mole) in dry tetrahydrofuran (100 ml.) was added to the mixture containing the sodio derivative at such a rate as to keep the temperature between −20 and −15°. A very dark colored solution resulted. The mixture was allowed to warm to 0° after which the tetrahydrofuran was removed under reduced pressure. Ice water (100 ml.) was added and the mixture shaken well, filtered and the black solid dried at the pump. The black solid was heated under reflux with ether (4× 300 ml.) and the ether decanted. 4 g. of black solid were left and this was discarded. The combined ether extracts were treated with decolorizing charcoal, filtered through diatomaceous earth ("Celite"), concentrated until crystallization commenced, then cooled and filtered, giving the product (10 g., 30%) as light yellow crystals, M.P. 130–132°.

The compound of this example exhibited minimum inhibitory concentrations vs. *K. pneumoniae* and *S. aureus* Smith of 0.4 and 12.5 mcg./ml., respectively. The $CD_{50}$ of this compound given orally vs. *K. pneumoniae* was 33×2 mgm./kg.

Example 2.—N,N-dimethylaminoethyl 5-amino-3-(5'-nitrofur-2'-yl)isoxazole-4-carboxylate Dimethylaminoethyl cyanoacetate was made in exactly the same way as the diethylaminoethyl ester of Example 1, using N,N-dimethylaminoethanol in place of the aminoalcohol used therein.

Sodium hydride (58% in oil, 5.7 g., 0.137 mole) was washed twice with hexane to remove the oil and then stirred with dry tetrahydrofuran (130 ml.) in an atmosphere of dry nitrogen. A solution of dimethylaminoethyl cyanoacetate (21.4 g., 0.137 mole) in dry tetrahydrofuran (30 ml.) was added and when the reaction was complete (no more gas evolution) the mixture was cooled to −20° and a solution of 5-nitrofuryl-2-chloraldoxime (26 g., 0.137 mole) in dry tetrahydrofuran (100 ml.) added at such a rate as to keep the temperature below −15°. After the addition was completed, the mixture was warmed to 0° and after 10 minutes at this temperature, ether (300 ml.) was added and the mixture filtered. The residue was triturated with water (200 ml.), filtered, washed with ether and dried, giving the product (19 g.—45%) as a light grey solid, M.P. 165–170° (dec.). The solid was recrystallized from tetrahydrofuran-ether as yellow crystals, M.P. 175–176° (dec.).

The compound of this example exhibited minimum inhibitory concentrations vs. *K. pneumoniae* and *S. aureus* Smith of 0.4 and 12.5 mcg./ml., respectively. The $CD_{50}$ of this compound given intramuscularly vs. *K. pneumoniae* was 12×2 mgm./kg. and given orally was 86×2.

Example 3.—Morpholinoethyl 5-amino-3-(5'-nitrofur-2'-yl)isoxazole-4-carboxylate

Morpholinoethanol (13.1 g., 0.10 mole) and cyanoacetic acid (8.5 g., 0.10 mole) were dissolved in 150 ml. of ethyl acetate. The mixture was cooled in ice and N,N'-dicyclohexylcarbodiimido (20.6 g., 0.10 mole) was added in one portion. The mixture was kept at 0° for 30 minutes and was then allowed to reach room temperature in one hour. The N,N'-dicyclohexylurea was filtered off. The filtrate was concentrated to dryness and the residue triturated with ether which caused it to solidify. The solid was washed with a small amount of ice-cold ether to give 15.9 g. (80%) of solid morpholinoethyl cyanoacetate product, M.P. 49–56°.

Morpholinoethyl cyanoacetate (9.9 g., 0.050 mole) was added in portions to a stirred suspension of sodium hydride (1.25 g., 0.052 mole) in 50 ml. of anhydrous tetrahydrofuran, cooled in ice. The resulting solution was cooled to −20° and a solution of 5-nitrofuryl-2-chloraldoxime (9.5 g., 0.050 mole) in 30 ml. of anhydrous tetrahydrofuran was added dropwise thereto at such a rate as to keep the temperature between −20 and −15°. When the addition was completed, the reaction mixture was kept at −20° for 30 minutes and was then left at 0° for 16 hours. The solvent was removed under reduced pressure and the residue treated with 75 ml. of ice-water. A brown solid was filtered off, dried and recrystallized from 100 ml. of tetrahydrofuran (with treatment with decolorizing charcoal) to give 6.2 g. of pale yellow crystals, M.P. 203–205°. By concentrating the filtrate, an additional 2.1 g. of the product was obtained to give a total yield of 8.3 g. (47%). Two additional recrystallizations raised the decomposition point of the product to 205–206°.

The compound of this example exhibited minimum inhibitory concentrations vs. *K. pneumoniae, E. coli, Sal. enteritidis, T. foetus,* and *T. vaginalis* of 6.3, 12.5, 1.6, 1.25 and <0.04 mcg./ml., respectively. The $CD_{50}$ of this compound given orally vs. *K. pneumoniae* was 180×2 mgm./kg.

Example 4.—Piperidinoethyl 5-amino-3-(5'-nitrofur-2'-yl) isoxazole-4-carboxylate Piperidinoethyl cyanoacetate was prepared from piperidinoethanol (12.9 g., 0.10 mole), cyanoacetic acid (8.5 g., 0.10 mole) and N,N'-dicyclohexylcarbodiimide (20.6 g., 0.10 mole) in the same manner as described in detail for morpholinoethyl cyanoacetate in Example 3. The cyanoacetate was obtained as an oil and amounted to 19.9 g. (100%). The cyanoacetate (9.8 g., 0.050 mole) was allowed to react with sodium hydride (1.25 g., 0.052 mole) in tetrahydrofuran and the resulting salt condensed with 5-nitrofuryl-2-chloraldoxime (9.5 g., 0.050 mole) to the desired product by the same procedure as described in detail for the morpholinoethyl ester in Example 3. The crude product was recrystallized from tetrahydrofuran to give 4.0 g. of beige colored solid, M.P. 172–174°. An additional 3.5 of less pure product was obtained from the filtrate, M.P. 163–166°. The total yield was 7.5 g. (43%).

The compound of this example exhibited minimum inhibitory concentrations vs. *K. pneumoniae*, *E. coli*, *Sal. enteritidis*, *T. foetus*, and *T. vaginalis* of 1.6, 3.1, 0.8, 0.32 and 0.32 mcg./ml., respectively.

Example 5.—N-methylpiperid-4-yl 5-amino-3-(5'-nitrofur-2'-yl)isoxazole-4-carboxylate N-methylpiperidyl cyanoacetate was prepared from 4-hydroxy-N-methylpiperidine (11.5 g., 0.10 mole), cyanoacetic acid (0.5 g., 0.10 mole) and N,N'-dicyclohexylcarbodiimide (20.6 g., 0.10 mole) in the same manner as described in detail for morpholinoethyl cyanoacetate in Example 3. The reaction was effected for 16 hours at room temperature. The cyanoacetate was obtained as an oil (17.3 g., 95%) and used for the next step without any further purification. The cyanoacetate (9.1 g., 0.050 mole) was treated with sodium hydride (1.25 g., 0.050 mole) and condensed with 5-nitrofuryl-2-chloraldoxime (9.5 g., 0.050 mole) to the desired product by the same procedure as described for the morpholinoethyl ester in Example 3. The crude product was recrystallized from tetrahydrofuran to give 4.1 g. of beige colored crystals melting at 114–118°, then resolidifying and, upon further heating, decomposing at 163–166°. After a second recrystallization, the material melted with decomposition at 166–167°. A second crop of the product (2.1 g., M.P. 163–166°/dec.) was obtained by concentrating the filtrate. The total yield was 6.3 g. (38%).

The compound of this example exhibited minimum inhibitory concentrations vs. *K. pneumoniae*, *E. coli*, *Sal. enteritidis*, *T. foetus*, and *T. vaginalis* of 0.8, 3.1, 0.4, 2.5 and 2.5 mcg./ml., respectively. The $CD_{50}$ of this compound given orally vs. *K. pneumoniae* was 18×2 mgm./kg.

Example 6.—N,N-dimethylaminopropyl 5-amino-3-(5'-nitrofur-2'-yl)-isoxazole-4-carboxylate N,N-dimethylaminopropyl cyanoacetate was prepared from 3-N,N-dimethylaminopropanol (10.3 g., 0.10 mole), cyanoacetic acid 8.5 g., 0.10 mole) and N,N-dicyclohexylcarbodiimide (20.6 g., 0.10 mole) by the same procedure as described in Example 3 for morpholinoethyl cyanoacetate. The cyanoacetate was obtained as an oil (17.7 g., 105%) which was used without further purification. The cyanoacetate (8.5 g., 0.050 mole) was allowed to react with sodium hydride (1.25 g., 0.052 mole) followed by condensation with 5-nitrofuryl-2-chloraldoxime (9.5 g., 0.050 mole) by the same procedure as described in Example 3 for the morpholinoethyl ester. The product was recrystallized from tetrahydrofuranether to give 2.6 g. (16%) of yellow crystals, M.P. 152–154.

The compound of this example exhibited minimum inhibitory concentrations vs. *K. pneumoniae*, *E. coli*, *Sal. enteritidis*, *T. foetus*, and *T. vaginalis* of 1.6, 3.1, 0.4, 2.5 and 2.5 mcg./ml., respectively. The $CD_{50}$ of this compound given orally vs. *K. pneumoniae* was 16×2 mgm./kg.

PREPARATION OF STARTING MATERIAL (A) 5-Nitrofurfuraldoxime.—5-nitrofurfural diacetate (24.3 gm., 0.1 mole), hydroxylamine hydrochloride (8.4 gm., 0.12 mole) and aqueous hydrochloric acid (300 ml. of a 3 molar solution) were heated with stirring under reflux until complete solution (ca. 15 minutes) and for 30 minutes longer. The resulting yellow solution was cooled with stirring in an ice bath, filtered, washed with ice water (ca. 200 ml.) and dried in an oven at 40° C. The resulting yellow crystals weighed 12.6 gm. (81%). The oxime is quite soluble in ether but not appreciably soluble in chloroform or methylene chloride.

(B) 5-Nitrofur-2-choraldoxime.—An ice cold solution of nitrosyl chloride (5.0 gm., 0.077 mole) in anhydrous ether (50 ml.) was added to an ice cold solution of 5-nitrofurfuraldoxime (10.9 gm., 0.07 mole) and the mixture allowed to come to room temperature. A solid separated and there was the slow evolution of gas. The reaction mixture was left overnight at room temperature and filtered from a small amount of yellow solid. The ether was removed under reduced pressure, hexane (100 ml.) added, and the yellow solid filtered and dried under vacuum at room temperature. The yellow solid, M.P. 132–143° C., weighed 11.0 gm. (85%) and is sufficiently pure for the next reaction.

The chloroxime should be used as soon as possible but may be stored under refrigeration for a day before use.

We claim:
1. A compound of the formula:

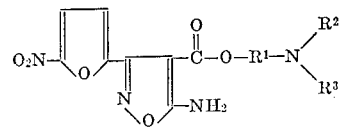

wherein $R^1$ is ethylene or propylene and $R^2$ and $R^3$ are lower-alkyl or together with N, are morpholino or piperidino; or a non-toxic pharmaceutically acceptable acid addition salt thereof.

2. A compound of claim 1 wherein $R^2$ and $R^3$ are ethyl and $R^1$ is ethylene.

3. A compound of claim 1 wherein $R^2$ and $R^3$ are methyl and $R^1$ is ethylene.

4. A compound of claim 1 wherein $R^1$ is ethylene and $R^2$ and $R^3$ taken together with the nitrogen atom are morpholino.

5. A compound of claim 1 wherein $R^1$ is ethylene and $R^2$ and $R^3$ taken together with the nitrogen atom are piperidino.

References Cited
FOREIGN PATENTS 1,040,551   9/1966   Great Britain.
1,490,038   6/1967   France.

ALTON D. ROLLINS, Primary Examiner

U.S. Cl. X.R.
260—294.3, 307, 465.4, 347.7; 424—248, 267, 272